United States Patent [19]

Smith

[11] Patent Number: 5,306,887
[45] Date of Patent: Apr. 26, 1994

[54] METHOD OF ACCELERATING THE HEATING OF AQUEOUS FLUIDS

[75] Inventor: Sammie H. Smith, Adamsville, Tenn.

[73] Assignee: Aqua Dynamics Group Corp., Adamsville, Tenn.

[21] Appl. No.: 697,064

[22] Filed: May 8, 1991

[51] Int. Cl.$^5$ ............................................. H05B 6/46
[52] U.S. Cl. .................................. 219/772; 219/687; 210/739; 210/748
[58] Field of Search ............... 219/10.51, 10.65, 10.81, 219/10.55 R, 10.491, 10.493, 10.77, 10.79, 10.75; 210/739, 85, 243, 748, 695, 222, 223; 204/196, 232, 302

[56] References Cited

U.S. PATENT DOCUMENTS

| | | | |
|---|---|---|---|
| 1,773,275 | 8/1930 | Neeley | 204/275 |
| 2,596,743 | 5/1952 | Vermeiren | 210/222 |
| 3,511,776 | 5/1970 | Avampato | 210/695 |
| 3,625,884 | 12/1971 | Waltrip | 210/19 |
| 4,288,323 | 9/1981 | Brigante | 210/222 |
| 4,365,975 | 12/1982 | Williams et al. | 48/197 R |
| 4,367,143 | 1/1983 | Carpenter | 210/222 |
| 4,407,719 | 10/1983 | Van Gorp | 210/695 |
| 4,545,887 | 10/1985 | Arnesen et al. | 204/280 |
| 4,582,629 | 4/1986 | Wolf | 252/348 |
| 4,659,479 | 4/1987 | Stickler et al. | 210/695 |
| 4,746,425 | 5/1988 | Stickler et al. | 210/175 |
| 4,808,306 | 2/1989 | Mitchell et al. | 210/222 |
| 4,865,747 | 9/1989 | Larson et al. | 210/695 |
| 4,865,748 | 9/1989 | Morse | 210/739 |
| 4,888,113 | 12/1989 | Holcomb | 210/222 |
| 4,963,268 | 10/1990 | Morse | 210/739 |

FOREIGN PATENT DOCUMENTS 463844 8/1928 Fed. Rep. of Germany .
417501 9/1934 United Kingdom .
606154 8/1948 United Kingdom .

OTHER PUBLICATIONS

"Aquabel"-Brochure.
"The Ion Stick", York Energy-Brochure.
"An Overview Of Pulse Plating", Norman M. Osero, Mar. 1986.

Primary Examiner—Bruce A. Reynolds
Assistant Examiner—Tu Hoang
Attorney, Agent, or Firm—Foley & Lardner

[57] ABSTRACT

The present invention relates to a method of treating aqueous fluids for the purpose of increasing the heat absorption characteristics thereof. The method also relates to treating aqueous fluid in applications where it is desired to use a certain amount of heat input to achieve a higher temperature for the fluid or where it is desired to achieve a certain temperature for the fluid using a lesser amount of heat input or to accelerate fluid heating. The treatment comprises directly injecting into the fluid electromagnetic radiation, most preferably electromagnetic radiation having a frequency between 1 KHz and 1000 MHz. In the most preferred embodiment, electromagnetic radiation is injected through a conductor directly in contact with the fluid.

6 Claims, 4 Drawing Sheets

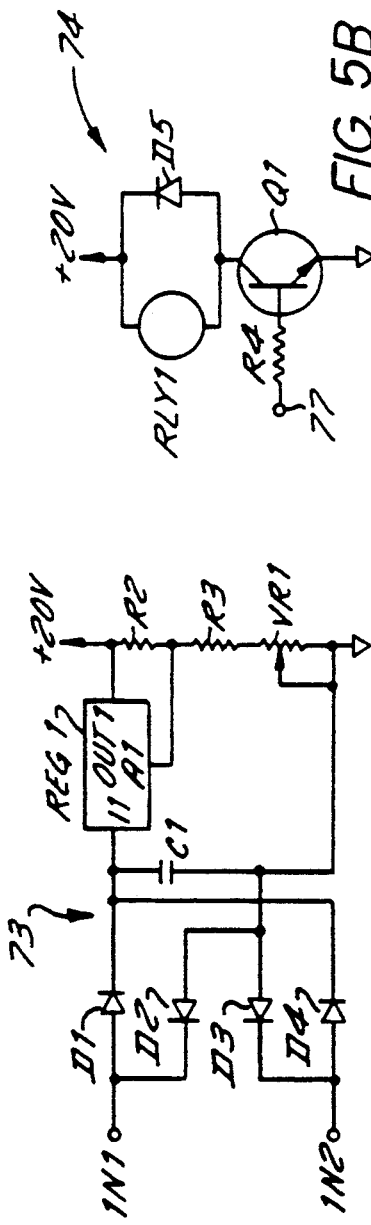
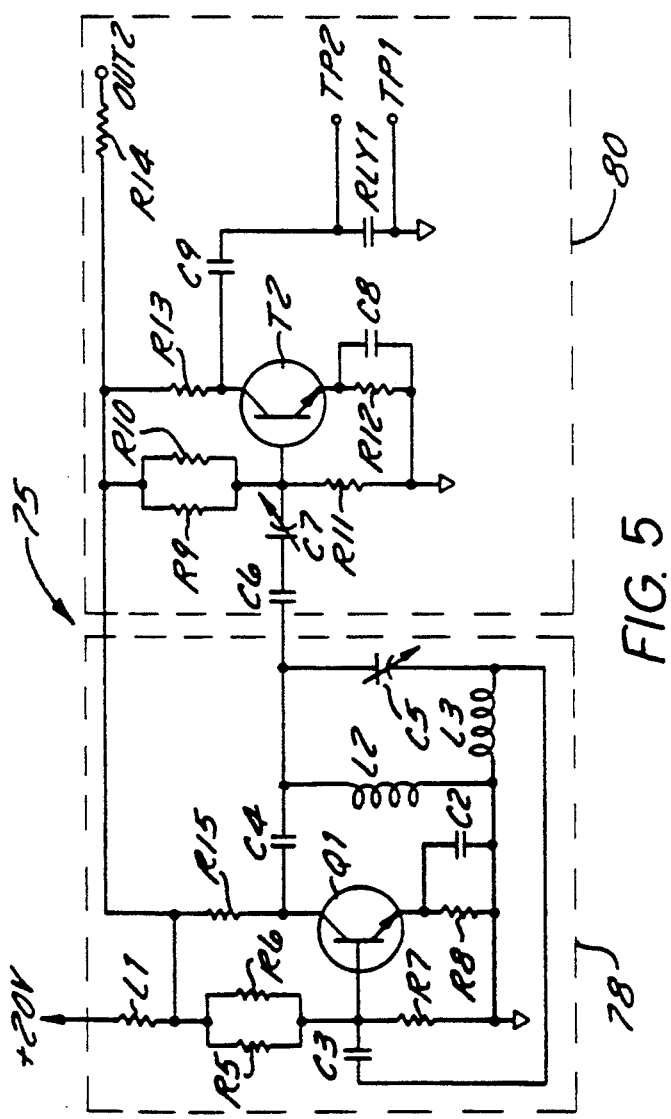
FIG. 5A
FIG. 5B
FIG. 5

METHOD OF ACCELERATING THE HEATING OF AQUEOUS FLUIDS

BACKGROUND OF THE INVENTION

1. Field of the Invention

The present invention relates generally to the art of treating aqueous fluids, and more specifically to a method for increasing the rate of heat absorption by an aqueous fluid. Still more specifically, the invention relates to a method of increasing the rate of heating of aqueous fluids by injecting into the fluid electromagnetic radiation, most preferably radiation having a frequency in the radio frequency range, with injection occurring through a conductor in direct contact with the fluid.

2. Description of the Prior Art

Numerous residential and industrial processes involve supplying heat to an aqueous fluid for various purposes. One common example would be the heating of fluid in residential hot water heating systems. Another example for industrial or commercial applications would be heating water in a boiler or other system for providing heat to the building or factory interior. It is also desirable in many applications to achieve as high a temperature as possible within a constrained period of time, e.g. quickly achieving a certain level of temperature in automobile radiators.

Prior to the present invention, it has always been believed that for a milliliter of pure water, one calorie of heat is required to raise the temperature of that quantity of water one degree. As will be demonstrated graphically in the following specification, the present invention provides a technique for reducing the amount of heat to achieve that amount of heating or, said another way, additional heating can be accomplished using the same quantity of heat input. Any system which would enable either of these two results to be achieved would provide substantial economic benefits by reducing energy consumption or speeding industrial processes and would therefore represent a substantial advance in this technology.

Numerous systems have been proposed over the years for treating aqueous solutions to obtain improvements in certain methods or to achieve certain properties for the treated solution. Several examples of the types of treatment include those involving the use of electromagnets, permanent magnets, ultrasound, electrostatic fields and the like. While some within the scientific community are convinced of the effectiveness of such treatment methods, considerable skepticism remains, and the devices which have been marketed have not received a high degree of commercial success. The types of applications with which such treatment methods have been employed are also widely varied. Some will be described below in connection with the description of certain specific prior art, but generally, they have included the treatment of aqueous solutions to prevent scaling in boilers, cooling towers and the like; the treatment of emulsions; the treatment of certain non-aqueous materials such as fuels for increasing the fuel burning efficiency thereof; the treatment of automobile radiator fluid; and other diverse applications.

Several representative samples of such prior art treatment systems will now be disclosed briefly, but particular attention should be direct to the Morse patents, the backgrounds provided therein, and the references cited against same.

One such treatment device, called the Ion Stick, utilizes the application of an electrostatic field, as illustrated in a brochure entitled "The Ion Stick", copies of which are provided with this specification. This device is a non-chemical, non-polluting electrostatic water treater energized by its own power pack. Another electrostatic treatment method and device is disclosed in U.S. Pat. No. 4,545,887 issued Oct. 8, 1985 to Arnesan, et al.

Other devices employ fixed magnets for water treatment. Examples include U.S. Pat. No. 4,808,306, issued Feb. 28, 1989 to Mitchell and entitled "Apparatus for Magnetically Treating Fluids", and U.S. Pat. No. 4,367,143, issued to Carpenter on Jan. 4, 1983 for "Apparatus for Magnetically Treating Liquid Flowing Through a Pipe and Clamping Means Therefor".

A different magnet arrangement for water treatment is disclosed in U.S. Pat. No. 4,888,113, issued to Holcomb on Dec. 19, 1989 for "Magnetic Water Treatment Device". In this patent, Holcomb discusses the use of a plurality of rectangular magnets attached to the exterior of a pipe. The magnets are arranged in pairs adjacent the pipe such that the positive pole of one pair is oriented to one end of the support housing and the negative pole is oriented toward the other end of the housing. Another similarly constructed housing is secured to the opposite side of the pipe, but reversed with respect to magnet polarity. Thus, the positive pole of the first set faces the negative pole of the second set to cause an "attractive" mode of magnetic flux treatment. Applications such as scale prevention, as well as use in washing machines, swimming pools, ice rinks, livestock watering, and coffee brewing are suggested. The patent also suggests that the taste of treated water is superior to that of untreated water. The patent further mentions that the magnetic force fields can be generated through wound iron coils coupled to a DC generator.

The assignee of the present invention is the owner of several patents relating to electromagnetic water treatment devices, including Stickler et al., U.S. Pat. No. 4,746,425, issued May 24, 1988 for "Cooling System for Magnetic Water Treating Device" and Stickler et al., U.S. Pat. No. 4,659,479, issued Apr. 21, 1987 for "Electromagnetic Water Treating Device". Both use a pipe core of alternating magnetic and non-magnetic sections with an electromagnet surrounding the pipe through which the fluid to be treated passes.

The prior art is replete with devices that employ electromagnetic energy for water treatment. Many such devices employ electromagnetic energy at a fixed frequency. Examples of such fixed frequency devices are U.S. Pat. No. 4,407,719, issued Oct. 4, 1983 to Van Gorp and entitled "Magnetic Water Treatment Apparatus and Method of Treating Water"; U.S. Pat. No. 4,288,323, issued Sep. 8, 1981 to Brigante and entitled "Free Flow Non-Corrosive Water Treatment Device"; and U.S. Pat. No. 2,596,743, issued May 13, 1952 to Vermeiren and entitled "Electric Device".

Several other United States patents disclose specific methods and/or devices which employ varied and/or mixed frequency electromagnetic energy. For example, U.S. Pat. No. 3,511,776, issued to Avanpoto, discloses a method of using various wavelengths of electromagnetic energy, mostly within the ultraviolet and x-ray spectra, to cause ionic species within a flowing water system to become more susceptible to attraction by a subsequent magnetic field.

U.S. Pat. No. 3,625,884, issued to Waltrip, discloses a sewage treatment method which employs multiple signal generators to simultaneously provide audio frequency and/or radio frequency energy at a number of different frequencies. The frequency output of each separate signal generator may be selected on the basis of the mineral content of the untreated sewage.

U.S. Pat. No. 4,365,975, issued to Williams et al., discloses a method of recovering alkali metal constituents from coal gasification residues by subjecting the residues to electromagnetic energy in the radio frequency-microwave (0.1 to $10^5$ MHz) range. Such electromagnetic radiation is purported to facilitate extraction of the metal.

Another treatment system is disclosed in a patent owned by the assignee of the present invention, namely Larson et al., U.S. Pat. No. 4,865,747, issued Sep. 12, 1989 for "Electromagnetic Fluid Treating Device and Method". An electromagnetic field having a voltage which operates in the range of 1 KHz to 1,000 MHz is applied to a non-ferromagnetic conduit in which a ferromagnetic core is mounted. The core acts as a sacrificial anode and as a receiving antenna for the radio frequency radiation.

Also designed for use in fighting scale formation, a device known as the "Aquabel" has been sold and purportedly involves an electronic circuit producing electromagnetic signals which are transmitted into water through cables coiled in a spiral shape around the water line. A copy of a brochure relating to this device is included with this specification.

Electromagnetic radiation, in the form of microwave radiation, is discussed as a treatment mechanism for emulsions in U.S. Pat. No. 4,582,629, issued to Wolf on Apr. 15, 1986.

An electromagnetic process for altering the energy content of dipolar substances is disclosed in British Patent 417,501, issued Dec. 28, 1934, to Johnson. According to Johnson, irradiating colloids with electromagnetic energy having a wavelength characteristic of the colloid will alter the mobility and viscosity of the colloid. Also, treatment of organic substances such as milk or meat will prevent aging of the substance. Another use is the treatment of living organic matter, such as bean seeds, to increase their growth.

Other methods and devices which involve the treatment of water using electromagnetic energy having a variable frequency include German Patent 463,844 issued Aug. 6, 1928 to Deutsch and British Patent 606,154, issued Aug. 6, 1948, to Brake.

Yet another type of scale prevention is disclosed in U.S. Pat. No. 1,773,275, issued Aug. 19, 1930 to Neeley, which discloses supplying an electric current to the water by subjecting the water to electromagnetic fields or by having it come into contact with electrically charge surfaces.

Another water treating technique is that disclosed in U.S. Pat. No. 4,865,748, issued Sep. 12, 1989 to D. Morse and entitled "Method and System for Variable Frequency Electromagnetic Water Treatment". In this patent, a conductor in direct contact with a fluid to be treated is coupled to a generator of electromagnetic radiation, preferably in the radio frequency range. According to the patent, the radiation is injected at a frequency which is related to the electromagnetic radiation absorption or emission profile of the particular system being treated. This patent focuses on the use of that device for the elimination and prevention of scale buildup in boiler systems and the like. The Morse patent is also owned by the assignee of the present invention. A continuation-in-part of the aforementioned Morse patent issued as U.S. Pat. No. 4,963,268 on Oct. 16, 1990.

SUMMARY OF THE INVENTION

The present invention features a method for accelerating the heat intake of aqueous fluids or reducing the amount of heat which must be put into an aqueous fluid system to achieve a desired temperature. A particular feature of the invention is the ability to save hydrocarbon or other types of fuels.

A further feature of the present invention is to modify existing installations to incorporate the treating device of the invention to carry out the method discussed in detail below.

The present invention also features a system in which the boiling point of an aqueous fluid is increased slightly, and a further feature of the invention is the adaptability of the invention to any number of residential, commercial and industrial applications wherein the heating of an aqueous fluid must be accomplished in an economical and timely manner.

How the above features of the invention are achieved will be described in detail in the following description of the preferred embodiment, taken in conjunction with the Figures. Generally, however, they are accomplished using a treating system which injects into an aqueous fluid, before and/or during use of the fluid, electromagnetic radiation, preferably radiation having a frequency within the radio frequency range of 1 KHz to 1000 MHz. The injection system preferably includes a generator of electromagnetic radiation, a cable for passing the radiation from a generator to an injector, and an injector, at least part of which is a conductor in direct contact with the fluid. Other ways in which the features of the invention are accomplished will become readily apparent to those skilled in the art after the present application has been read and understood. Such ways are also deemed to fall within the scope of the present invention, and the invention is not to be limited by the several illustrated embodiments. The present invention is to be limited solely by the scope of the claims which follow.

DESCRIPTION OF THE DRAWINGS

FIGS. 5-5B are a schematic diagram of the PC board of the frequency generator of FIG. 4.

In the various drawings, like reference numerals are used to describe like components.

DETAILED DESCRIPTION OF THE PREFERRED EMBODIMENT

Figure 1:
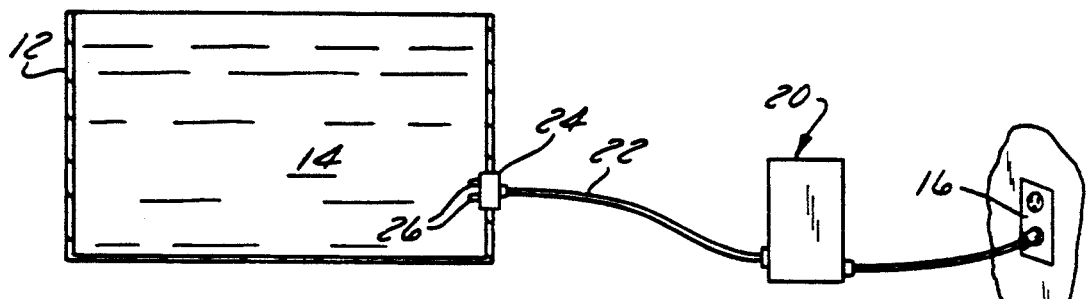
FIG. 1 is a schematic illustration of a simple system for treating an aqueous fluid in accordance with a preferred embodiment of the present invention.

Before proceeding to the detailed description of the preferred embodiment, several comments are appropriate with regard to the applicability of the invention. While two Figures are shown for the static and flowing treatment of an aqueous fluid, the way in which the fluid is contained for treatment could vary widely, and the two illustrations are not meant to be limiting in any way. Moreover, while only a limited number of examples are provided of situations wherein it is desirable to reduce the amount of heat used to achieve a certain temperature for an aqueous fluid or wherein it is desired to more quickly achieve a certain temperature for the fluid, many additional examples could be given and will be readily apparent to those skilled in the art.

The term "aqueous fluid" is used throughout the present specification, and is meant to include water, including very pure naturally occurring forms of water to forms which include various mineral and other constituents. The term is also meant to include aqueous solutions or suspensions of various materials, including those commonly encountered in industrial environments such as acidic and basic solutions, salt solutions and the like. The term is also meant to include solutions used in industrial applications wherein additives such as dyes, pigments, agricultural materials (fertilizers, pesticides, herbicides) and the like are included. The term is also meant to include solutions wherein water is the major constituent and solutions wherein water is a minor constituent. It is also apparent that the present invention is effective for reducing the evaporation rate of polar materials other than water, such as alcohols, glycols and the like. Such solutions are deemed to be aqueous fluids in the context of the present invention.

Again, by way of introduction, it would be helpful at this point to generally describe the effect of the direct injection system, as it is currently understood. This description is without prejudice to other explanations and other mechanisms which might result from the direct injection of electromagnetic radiation into the fluid. Testing conducted by the assignee of the present invention has indicated that direct injection causes fundamental changes in the physical constants of water which have a beneficial effect on numerous industrial applications. The clustering properties of the water molecules are believed to be altered. Typically, it is believed that water molecules cluster in molecular groups of as high as 100 molecules or more. After treatment, according to this invention, it is believed that the molecular clusters are substantially reduced in size. This phenomenon may play a part in the results achieved with regard to the rate of heating of aqueous fluids following treatment. This theory is also consistent with the explanation of FIG. 3, where it is shown that the rate of heating differential diminishes as the boiling point of water is approached. Normal molecular clusters of water will tend to break down into smaller sizes as the temperature of water is increased toward its boiling point.

It has also been determined that numerous other physical properties associated with water are modified, including such properties as the boiling point, freezing point, surface tension, dielectric constants, solvation effects and the like.

The following Table A lists certain characteristics of water which are well documented in recognized sources, together with the comparable figures for distilled water after treatment by a system for directly injecting into the water electromagnetic radiation in the radio frequency range ("Treated Water"). All testing was done using well-known testing procedures and the tests were done at least three times to verify the accuracy of the numbers reported. It should be kept in mind in examining Table A that the tests were performed on divided samples of a particular solution. The injector system used for the testing will be described in detail in connection with FIGS. 4–5, and the treatment of the water prior to the testing with the results shown in Table A was carried out for sixty (60) minutes using a radio frequency injection of 43.9 MHz and a current of 425 milliamps at 50 volts p/p.

It is also believed that the frequency of the injected radiation plays a part in the alteration of the physical properties of the aqueous fluids, and this belief is verified by the fact that the NMR frequency associated with the hydrogen atom is 42.5759 MHz, a number very near that used for testing. It is also believed that other frequencies determinable from text books for other atomic species present in a particular fluid in the solute or solvent could be beneficially injected into the fluid. Injection of several frequencies using separate injectors, frequency scanning or multiplexing could result in even greater improvements than those noted below. Current testing would indicate that the water molecules themselves are the most strongly affected.

Testing conducted on solutions of commonly encountered compounds including calcium, magnesium and silica compounds has produced numerous surprising results which may involve the clustering phenomenon mentioned above or which may involve the effects of the energy on the ionic or colloidal suspensions present in the solution. For example, significant changes have been noted in freezing and melting points, ion mobility, dissolved oxygen properties, solubility characteristics and changes in the anti-microbial properties of the fluids. Moreover, changes in the density of the fluids, before and after treatment at various temperatures, has also been documented.

TABLE A

| Property | $H_2O$ | Treated Water |
| --- | --- | --- |
| Boiling Point | 100.0° C. | 101.0° C. |
| Melting Point | 0.0° C. | 1.5° C. |
| Temp. Max Density | 3.98° C. | 8.00° C. |
| Refractive Index | 1.336 | 1.349 |
| Dielectric Constant | 81.77 | 85.80 |
| Surface Tension | 73.7 | 62.50 |
| Dipole Moment | 1.76 | 1.77 |
| Specific Heat | 1.00 | 0.98 |
| Magnetic Moment | 0.72 | 0.68 |
| Ionization Potential | $1 \times 10^{-14}$ | $5 \times 10^{-14}$ |

Proceeding next to FIG. 1, a simple treating system is shown to include a tank 12 containing a quantity 14 of an aqueous fluid to be treated by the direct injection system of the present invention. An outlet 16 is shown adjacent to the tank and a radio frequency generator 20 is coupled thereto. A coaxial cable 22 is attached to the generator, with the length being preferably selected to correspond to one wave length for the frequency of electromagnetic energy used. Various multiplies or divisions of that wave length could also be used. The cable is coupled to an injector 24 having a pair of tips 26, both in contact with the fluid to be treated. Electromagnetic radiation in the radio frequency range is preferably injected at 42.7 MHz with an amperage of approximately 425 milliamps at 45 volts.

While the optimum length of time for the direct injection has not been determined for all solutions, it has been documented that a memory effect does exist, and that the beneficial properties, such as the ability to absorb heat more rapidly continues after the treatment is completed or interrupted. In the present invention, it is contemplated that the treatment may take place before use of the treated fluid or may be carried out continuously or intermittently during such use. When one thinks of the various applications which have been previously mentioned and which will be briefly discussed below, examples of each become readily apparent.

Figure 2:
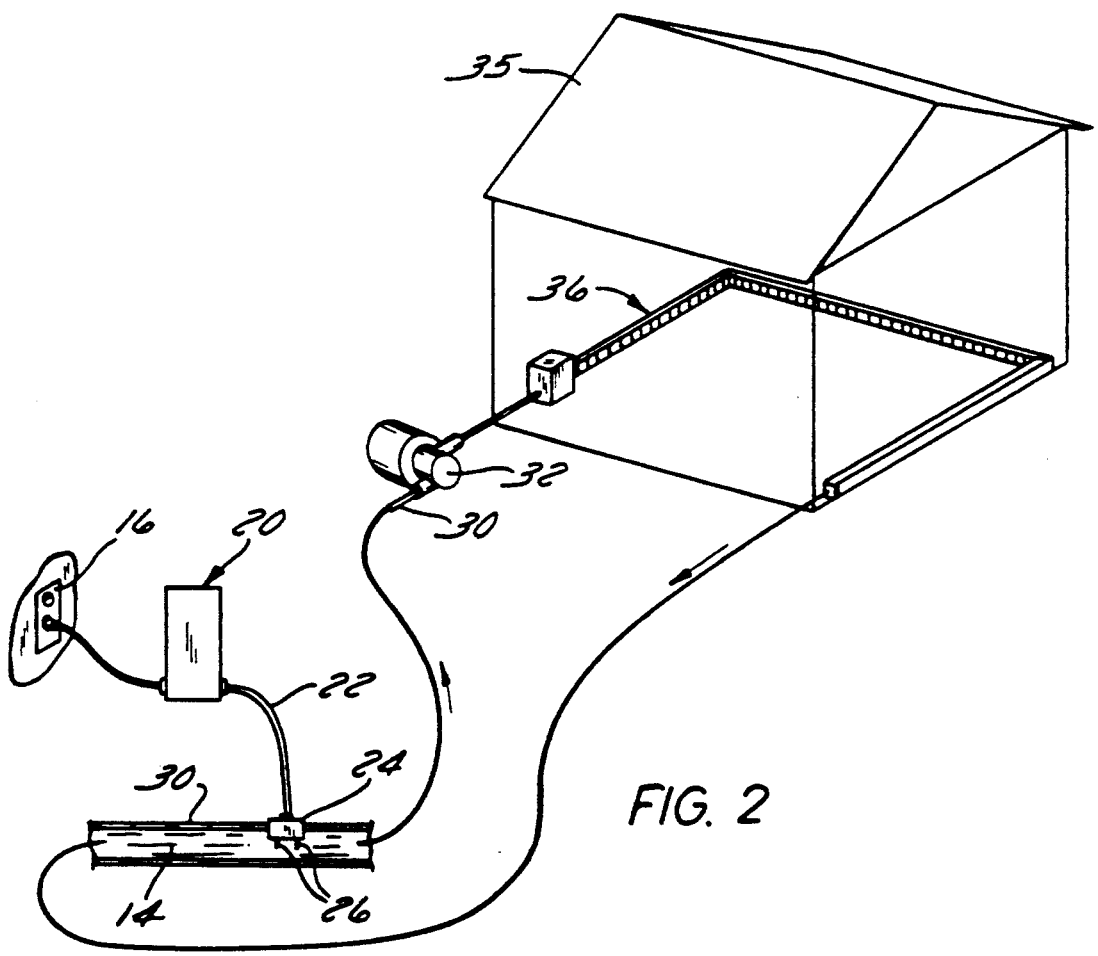
FIG. 2 is a schematic illustration of the use of the treating system of the present invention in a residential heating system.

As shown in FIG. 2, another system is depicted in schematic form where the treatment takes place in a flowing water stream, as opposed to in a reservoir or tank such as tank 12. In the second illustration, all components are the same except that a non-electrically conductive conduit portion 30 is provided. The liquid 14 flowing through the conduit is shown entering a pump 32 which is then shown in schematic form as feeding a hot water heating system for a residence 35, the heating system being shown generally as 36, a baseboard water pipe.

Figure 3:
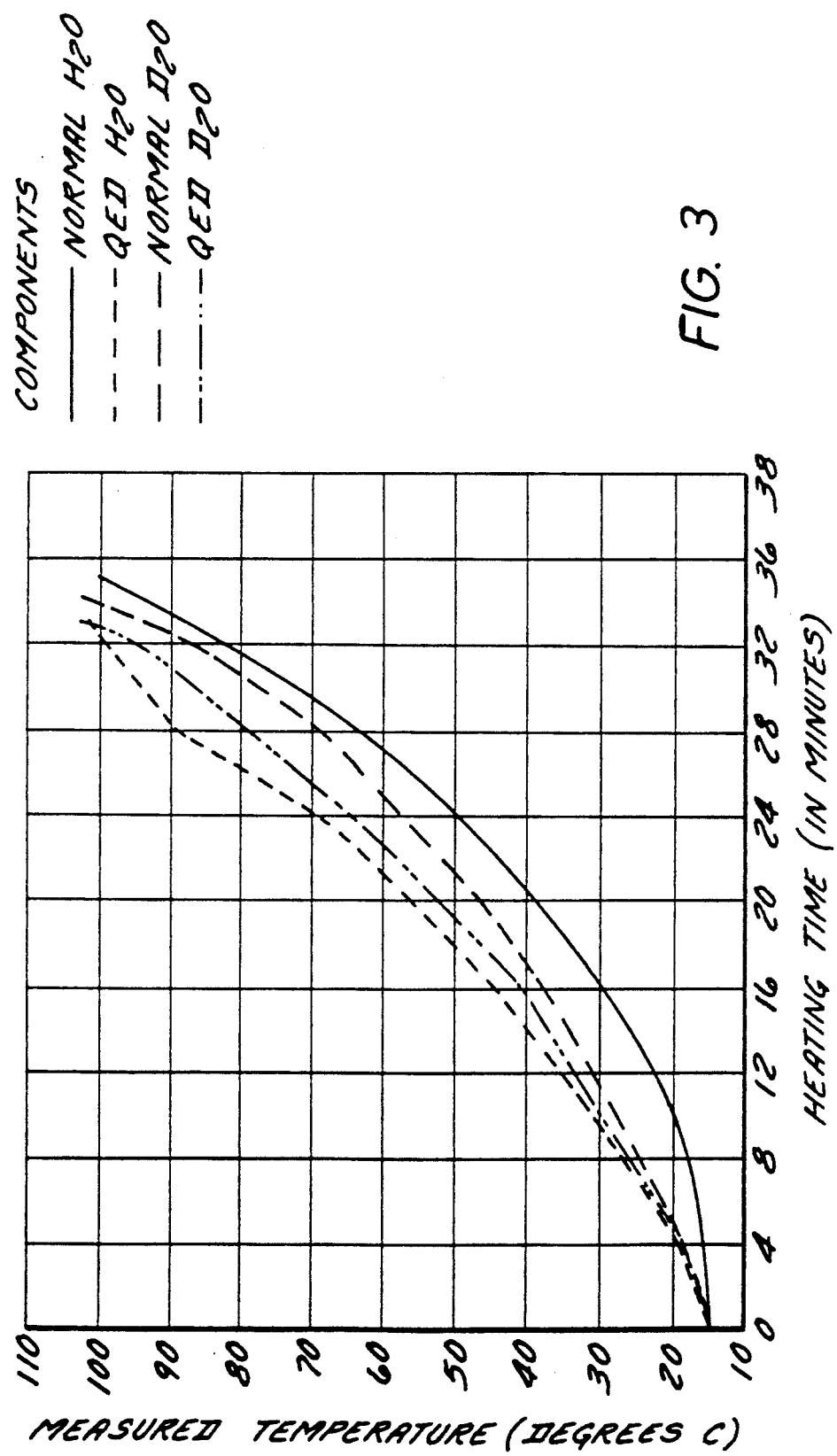
FIG. 3 is a graph of measured temperature vs. heating time for treated and untreated water.

Referring next to FIG. 3, a graph shows the measured temperature vs. heating time for normal water (shown in solid line) and for treated water (shown in dotted line). The water was treated for one (1) hour prior to testing, and testing was carried out by placing beakers of each solution on a heating plate at 150° C. Taking the twenty-four (24) minute time period as an example, it can be noted that the treated water was heated by the heat source to 70° C. as compared to 50° C. for the untreated solution. After sixteen (16) minutes, the treated system was heated to 42° C. as compared to approximately 28° C. Looking at FIG. 3 in another way, it can be seen that if it were desired to raise the temperature of the water to 50° C., such heating would take approximately eighteen (18) minutes using the treated water, as compared to twenty-four (24) minutes using normal water. It can also be noted from this graph that the effects are most dramatic as the temperature is raised above about 15° C. and that the effect diminishes as the boiling point is reached. As previously indicated in Table A, the boiling point of the treated water is higher than for untreated water.

Before proceeding to a detailed description of the injector systems, it should be mentioned here that the number of injectors could vary widely depending on the particular application. For example, for small scale applications such as home heating, a single injector would be suitable. For larger applications involving larger quantities of the aqueous fluid, a larger number of injector systems could be used, and the number thereof could be determined by one skilled in the art with straightforward experimentation on the particular system.

Figure 4:
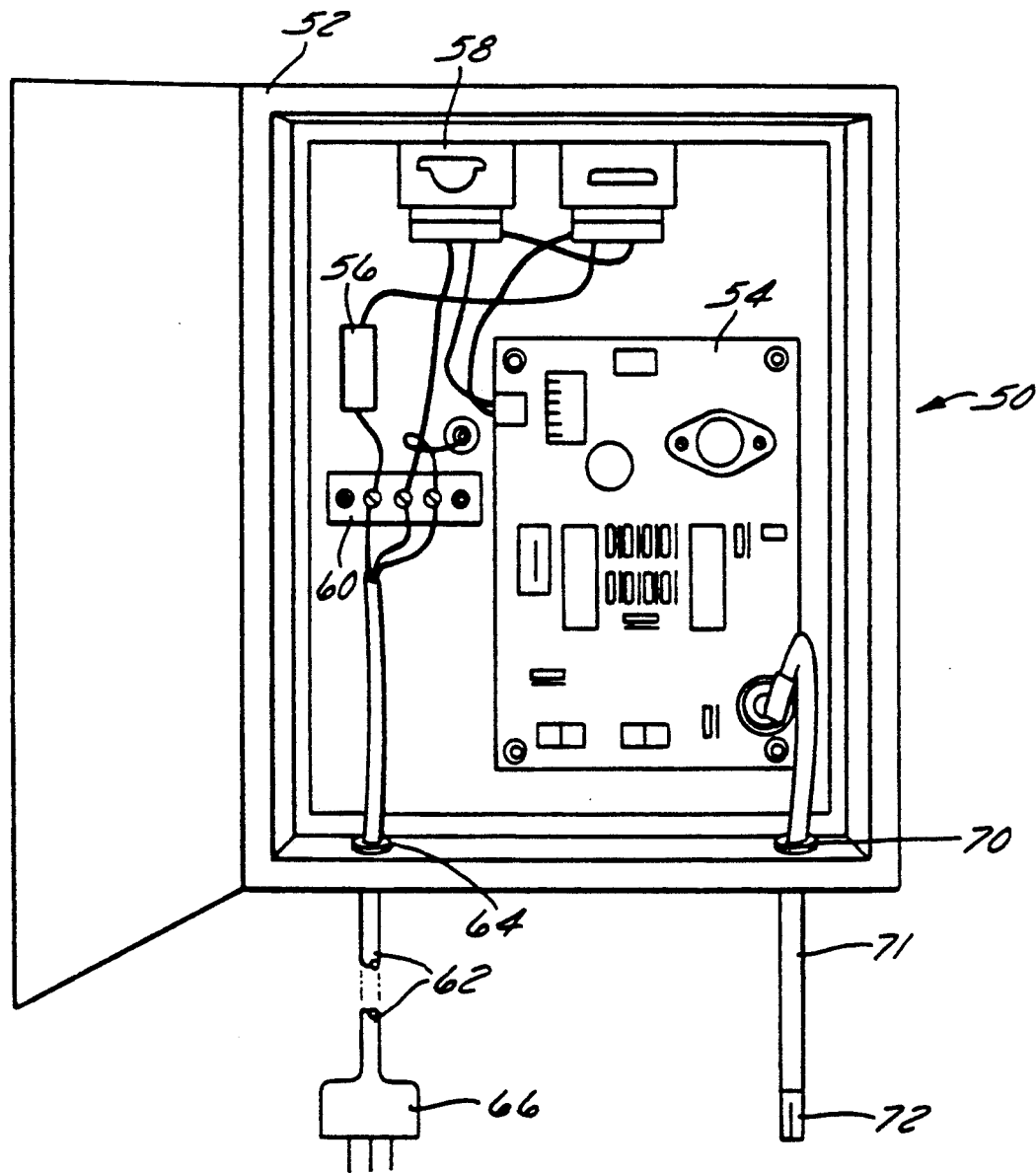
FIG. 4 is a front view of the frequency generator used in the preferred embodiment of the present invention and illustrated in schematic form in FIGS. 1 and 2.

Referring now to FIG. 4, a radio frequency generators 50 (like that shown as 20 in FIGS. 1-2) is shown in detail. Radio frequency generator 50 includes a casing 51 comprised of galvanized steel or 11 gauge sheet aluminum. A PC board 54, a fuse 56, a transformer 58, and a terminal block 60 are mounted within casing 51. A power supply cord 62 is connected to terminal block 60 and extends through a hole 64 in one side of case 52. Power cord 62 terminates in a conventional three-prong plug 66 for insertion into a common 120 volt AC outlet. Cable 52 is connected to PC board 54 and passes through an opening 70 in case 51. As stated above, cable 52 is coaxial, and preferably an RG59/U type coaxial cable. Cable 52 terminates in a platinum tipped spark plug 72 whose casing is removed. Other materials may be used to terminate cable 52 such as, stainless steel injector electrodes which are milled to be approximately 1" long and ¼" in diameter. The length of coaxial cable 52 is selected such that it is approximately either one wave length, one quarter wave length, or one-half wave length of the RF signal injected into the bath. For example, for an RF signal having a frequency of 42.7 MHz the cable should preferably have a length of 23 feet to be one wave length long. For other treatment frequencies, the cable length would preferably change to the appropriate length dictated by the new wave length or a harmonic thereof.

In operation, radio frequency generator 50 is connected to an AC 120 volt power source, such as a common household electrical outlet through power cord 62. Power cord 62 terminates at terminal block 60 and the 120 volt AC power is provided to transformer 58 through fuse 56. Fuse 56 is rated at 0.5 amps and protects the circuit on PC board 54 in the event of a short circuit by open circuiting with a momentary short at either the primary or the secondary of transformer 58. Transformer 58 transforms the 120 volt AC, 60 hertz power to 20 volts AC, 60 hertz. Transformer 58 provides power to PC board 54, which generates an RF signal having a typical peak-to-peak voltage of 45 volts. The 45 volt peak-to-peak RF signal is provided on coaxial cable 52 to spark plug 72, where it is injected into the bath.

Referring now to FIG. 5, a circuit diagram of the components on PC board 54 is shown. There are three different circuits on PC board 54: a power supply circuit 73 (FIG. 5A), a turn off circuit 74 (FIG. 5B), and an oscillator circuit 75 (FIG. 5). Power supply circuit 73 provides power to turn off circuit 74 and oscillator circuit 75. Turn off circuit 74 is used to disable the output of oscillator circuit 75 and may be omitted in alternative embodiments. Oscillator circuit 75 generates the RF signal which is injected into the bath. Power supply circuit 73 includes terminals IN1 and IN2, diodes D1-D4, capacitor C1, resistors R2 and R3, variable resistor VR1, and voltage regulator REG1. A 20 volt RMS AC signal is applied by transformer 108 to terminals IN1 and IN2. Diodes D1-D4 rectify the 20 volt AC signal and the AC ripple is filtered by capacitor C9. The rectified and filtered 20 volts DC is provided to input terminal I1 of voltage regulator REG1. The output terminal OUT1 and adjust terminal A1 of voltage regulator REG1 are connected to a voltage divider resistor network comprised of R2, R3 and VR1 to provide +20 volts at terminal OUT1 of voltage regulator REG1. The voltage of OUT1 is adjusted by adjusting the resistance of VR1. The +20 volt supply is then provided to turn off circuit 74 and oscillation circuit 75.

Turn off circuit 74 is comprised of an input 77, a resistor R4, a relay RLY1, a diode D5 and a transistor Q1. Turn off circuit 74 is coupled to power supply circuit 73 and receives the +20 volt power supply. Resistor R4 is applied to the base of Q1 and the emitter of Q1 is connected to ground. The collector of Q1 is connected to the parallel combination of the coil of relay RLY1 and diode D5. The opposite ends of relay RLY1 and diode D5 are connected to the positive +20 volt supply. When a positive voltage, relative to ground, sufficient to turn on transistor Q1, is applied to the base of Q1 through resistor R4 and input 77, transistor Q1 begins conducting and causes relay RLY1 to trip. As will be explained later, this causes the output of oscillator circuit 75 to be grounded, in effect turning off oscillator circuit 75.

Oscillator circuit 75 is coupled to power supply circuit 73 and is powered by the +20 volt power supply. Output OUT2, for lighting an LED, and outputs TP1, TP2 which carry the 45 volt peak-to-peak RF signal are provided. Generally, oscillator 75 includes tank circuit 78 and amplifier circuit 80. Tank circuit 78 provides a RF signal at a frequency of about 42.7 MHz, and an amplitude of about 10 volts peak-to-peak. The amplitude is controlled by the magnitude of the supply signal, and thus selected by adjusting the resistance of VR1, in power supply circuit 73. The RF signal is provided to amplifying circuit 80, where it is amplified to about 45 volts peak-to-peak. Tank circuit 78 includes resistors R5, R6, R7, R8, R9, capacitors C2, C3, and C4, variable capacitor C5, inductors L1, L2 and L3, and a high frequency transistor T1.

Inductor L1 is provided to further filter the AC ripple in the +20 volt supply. Resistors R5, R6 and R7 are provided to DC bias the base of transistor T1, which has resistor R8 and capacitor C2 tied between the emitter and ground. Capacitors C3 and C4, variable capacitor C5, resistor R15 and inductors L2 and L3 complete a tank circuit which oscillates at a frequency selected by adjusting the capacitance of variable capacitor C5. It has been determined that using components having the values listed below provides a tank circuit that operates at a frequency of about 42.7 MHz. If treatment frequencies other than 42.7 MHz are desired, one skilled in this art will recognize that changing the values of the tank current components just identified would result in a new output frequency. Moreover, as previously mentioned, different frequencies could be applied in the treating step by using multiple generators, crystal systems or by frequency scanning or multiplexing tank 78.

The output of tank circuit 78 is provided to amplifier circuit 80. Amplifier circuit 80 includes capacitors C6, C8 and C9, variable capacitor C7, resistors R9, R10, R11, R12, R13 and transistors T2 and Q2. The approximately 10 volt peak-to-peak AC signal is provided through capacitor C6 and variable capacitor C7 to the base of transistor T2. The DC bias set for the base of transistor T2 is provided by a voltage divider network comprised of R9, R10 and R11. Variable capacitor C7 couples with tank circuit 54 and is used to fine tune the frequency of its output, in cooperation with variable capacitor C3. Transistor T2 amplifies the RF signal, which is then provided to output TP2 through capacitor C9. Output TP1 is connected to ground so that the 45 volt peak-to-peak AC signal is seen across outputs TP2 and TP1. Relay RLY1 is connected across TP2 and TP1 so that when the coil of RLY1 is set, a short circuit is provided between TP1 and TP2, grounding the output provided by oscillator circuit 80. As described above, the RF signal across TP1 and TP2 is provided to coaxial cable 18 for treating the bath.

The +20 volt power supply is provided to output OUT2 through a resistor R14 for illuminating an external LED. The external LED is illuminated when power is applied to oscillator circuit 75.

Radio frequency generator 140 thus provides a 45 volt peak-to-peak RF signal having a frequency of about 42.7 MHz for injection into the bath. The device is powered by conventional house current and delivers the signal using coaxial cable 71 terminated with a platinum tipped spark plug 72. For maximum power transfer, certain applications may require impedance matching of the coaxial cable, thus reducing standing waves to the minimum.

| IDENTIFICATION OF CIRCUIT COMPONENTS | |
|---|---|
| L1 | 102 μH |
| L2 | 0.1 μH |
| L3 | 0.1 μH |
| T1 | NTE235 |
| T2 | NTE235 |
| VR1 | 1K Ω |
| R2 | 240 Ω |
| R3 | 3.3K Ω |
| R4 | 1K Ω |
| R5 | 680 Ω |
| R6 | 680 Ω |
| R7 | 47 Ω |
| R8 | 10 Ω |
| R9 | 680 Ω |
| R10 | 680 Ω |
| R11 | 47 Ω |
| R12 | 10 Ω |
| R13 | 51 Ω |
| R14 | 2.2K Ω |
| R15 | 51 Ω |
| C1 | 1,000 uF |
| C2 | .001 nF |
| C3 | 47 p4 |
| C4 | 33 p4 |
| C5 | 20–100 pF |
| C6 | 100 pF |
| C7 | 20–100 pF |
| C8 | 47 pF |
| C9 | 47 pF |
| D1 | 1N 5401 |
| D2 | 1N 5401 |
| D3 | 1N 5401 |
| D4 | 1N 5401 |
| D5 | 1N 4804 |
| REG1 | LM338 |
| RLY1 | A28-ICH-24DE |
| Q1 | 2N3904 |
| Q2 | 2N3904 |

While a graph and several schematic illustrations have been presented to show the remarkable heating acceleration obtained by the treatment of aqueous fluids, and the ability to elevate the temperature thereof to a higher level using the same heat input, the invention is not to be limited to the specifics of the graphs or schematics examples, but it is to be limited solely by the scope of the claims which follow.

What is claimed is:

1. A method for heating a quantity of an aqueous fluid comprising the steps of providing an electromagnetic radiation generator and a conductor coupled thereto, treating the aqueous fluid by injecting into said aqueous fluid electromagnetic radiation, said injecting step being accomplished by having the conductor contact with the aqueous fluid, and providing heat to the treated aqueous fluid to increase a temperature thereof to a predetermined temperature wherein the heat provided to the treated aqueous fluid being less than the heat required to raise the temperature of untreated aqueous fluid to said predetermined temperature.

2. The method of claim 1 wherein the electromagnetic radiation has a frequency between 1 KHz and 1000 MHz.

3. The method of claim 2 wherein the electromagnetic radiation has a frequency between 1 MHz and 100 MHz.

4. The method of claim 1 wherein the conductor is a spark plug.

5. The method of claim 1 wherein the treated aqueous fluid is used for providing heat to a building.

6. The method of claim 1 wherein the aqueous fluid is water.

* * * * *